United States Statutory Invention Registration [19]

[11] Reg. Number: H572

Hansen [43] Published: Feb. 7, 1989

[54] OPTICAL ANALYZER

[75] Inventor: Anthony D. Hansen, Berkeley, Calif.

[73] Assignee: The United States of America as represented by the United States Department of Energy, Washington, D.C.

[21] Appl. No.: 101,534

[22] Filed: Sep. 28, 1987

[51] Int. Cl.[4] ..... G01N 21/00

[52] U.S. Cl. ..... 356/439; 356/38; 356/432; 356/440

[58] Field of Search ..... 356/38, 432, 433, 434, 356/435, 438, 439, 440

[56] References Cited

U.S. PATENT DOCUMENTS

| | | | |
|---|---|---|---|
| 2,877,683 | 3/1959 | Fischer | 356/367 |
| 3,881,992 | 5/1975 | Ralston | 356/319 |
| 4,123,159 | 10/1959 | Hollander et al. | 356/38 |

OTHER PUBLICATIONS

Dod et al. (1979), "Opticothermal Analysis of the Coronaceous Fraction of Aerosol Particles," Atmospheric Aerosol Research Annual Report, 1977–78, LBL-8696, pp. 2–10.

Dod et al. (1980), "Application of Thermal Analysis to the Characterization of Nitrogenous Aerosol Species," Atmospheric Aerosol Research FY-1979, Chapter in the Energy and Environmental Annual Report, 1979, LBL-10735, pp. 8–25, Jul. 1980.

Gundel et al., "Determination of Black Carbon by Thermal Analysis," Environmental Pollutant Studies, Chapter from the Energy and Environment Division Annual Report, 1980, LBL-11986, pp. 5–26, Feb. 1981.

Gundel et al (1984), "The Relationship Between Optical Attenuation and Black Carbon for Urban, Arctic, and Source Carbonaceous Particles," FY 1983 Annual Report, Environmental Research Program, LBL-17073, pp. 4–8, May 1984.

Gundel et al. (1984), "The Relationship Between Optical Attenuation and Black Carbon Concentration for Ambient and Source Particles," The Science of the Total Environment, 36 (1984), pp. 197–202.

*Primary Examiner*—Stephen C. Buczinski
*Assistant Examiner*—Linda J. Wallace
*Attorney, Agent, or Firm*—L. E. Carnahan; Clifton E. Clouse, Jr.; Judson R. Hightower

[57] ABSTRACT

An optical analyzer (10) wherein a sample (19) of particulate matter, and particularly of organic matter, which has been collected on a quartz fiber filter (20) is placed in a combustion tube (11), and light from a light source (14) is passed through the sample (19). The temperature of the sample (19) is raised at a controlled rate and in a controlled atmosphere. The magnitude of the transmission of light through the sample (19) is detected (18) as the temperature is raised. A data processor (23), differentiator (28) and a two pen recorder (24) provide a chart of the optical transmission versus temperature and the rate of change of optical transmission versus temperature signatures (T and D) of the sample (19). These signatures provide information as to physical and chemical processes and a variety of quantitative and qualitative information about the sample (19). Additional information is obtained by repeating the run in different atmospheres and/or different rates of heating with other samples of the same particulate material collected on other filters.

18 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL ANALYZER

The U.S. government has rights in this invention pursuant to Contract No. De-AC 03-76SF00098 between the U.S. Department of Energy and the University of California.

BACKGROUND OF THE INVENTION

This invention relates to optical analyzers and more particularly to an optical analyzer and a method of using the analyzer to analyze particulate matter, especially carbonaceous material.

The present invention is an extension of the optico-thermal method of analysis of light absorbing graphitic or black carbon in aerosol particulate material. Such material collected from ambient air or combustion sources always contains carbonaceous particles which are black or grey when collected on filters. In the optico-thermal method of analysis, a sample of particulate matter is collected on a clear quartz fiber filter. The sample is then placed in a combustion tube and heated at a controlled rate from room temperature to a temperature above the combustion temperature of the carbon in the material. A constant gas flow of an oxidizing atmosphere, ambient air or oxygen, is maintained by the sample during the heating.

As the sample is heated, decomposition of the carbon compounds in the sample will occur and carbon dioxide will be given off. The carbon dioxide concentration of the atmosphere leaving the sample is continuously monitored and the $CO_2$ concentration is plotted out on a graph versus the temperature of the sample. The plotted trace is commonly referred to as a "thermogram." With a constant gas flow and a linear rise in temperature of the sample, the area under the thermogram is proportional to the total mass of carbon in the sample.

Oftentimes, however, the thermogram will have a number of $CO_2$ peaks at different temperatures during the heating of the sample. For example, in addition to the $CO_2$ peak corresponding to the combustion of black carbon, there may be $CO_2$ peaks corresponding to volatilization and incomplete combustion of material which is not optically absorbing, or corresponding to combustion or pyrolysis of material which also is not optically absorbing. When the thermogram has these additional $CO_2$ peaks, the area under the thermogram is no longer proportional to the total mass of just the black carbon. In order to determine which $CO_2$ peak of the thermogram corresponds to the combustion of the black carbon in the sample, the light passing through the sample is detected and the degree of optical transmission of the sample is plotted out on the same chart with the thermogram. At some point during the heating, typically in the vicinity of 470 degrees C., the black carbon will combust and burn off with an accompanying sharp increase in the light transmission of the sample. This easily identified increase in optical transmission is used to identify the peak of the thermogram occurring during combustion of the black carbon. The area of the thermogram under this particular $CO_2$ peak thus provides the desired information as to the amount of black carbon in the sample.

The above-described optico-thermal method is effective in the identification of black carbon, but is of limited utility for other analyses. Further, the monitoring of the $CO_2$ concentration requires a relatively long period of time for a run. For example, the rate of heating is typically in the order of 10 C. degrees/min. Thus, a run, starting at room temperature and ending at about 700 C., will take over an hour.

SUMMARY OF THE INVENTION

It is the primary object of the present invention to provide a method and apparatus wherein portions of the presently used optico-thermal system provide much more information as to the physical attributes and chemical composition of the particle sample and in a much shorter time. Additional objects, advantages and novel features of the invention will be set forth in the description which follows, and in part will become apparent to those skilled in the art upon examination of the following, or may be learned by practice of the invention. The object and advantages of the invention may be realized and attained by means of the instrumentalities and combinations pointed out in the appended claims.

The present invention lies primarily in the recognition that the light transmission of a sample of particulate matter heated in a controlled atmosphere at a controlled rate, and the rate of change of the transmission, will yield much more valuable information then previously recognized.

To achieve the foregoing and other objects, and in accordance with the present invention as described and broadly cliimed herein, a method and apparatus for analyzing particulate matter is provided in which a sample of such matter is heated at a controlled rate in a controlled atmosphere, with the transmission of light through the sample, and the rate of change of the optical transmission, being plotted as a "signature" on a chart versus the temperature of the sample.

BRIEF DESCRIPTION OF THE DRAWINGS

The accompanying drawings, which are incorporated in and form part of the application, together with the description, serve to explain the principles of the invention.

DESCRIPTION OF THE PREFERRED EMBODIMENT

Figure 1:
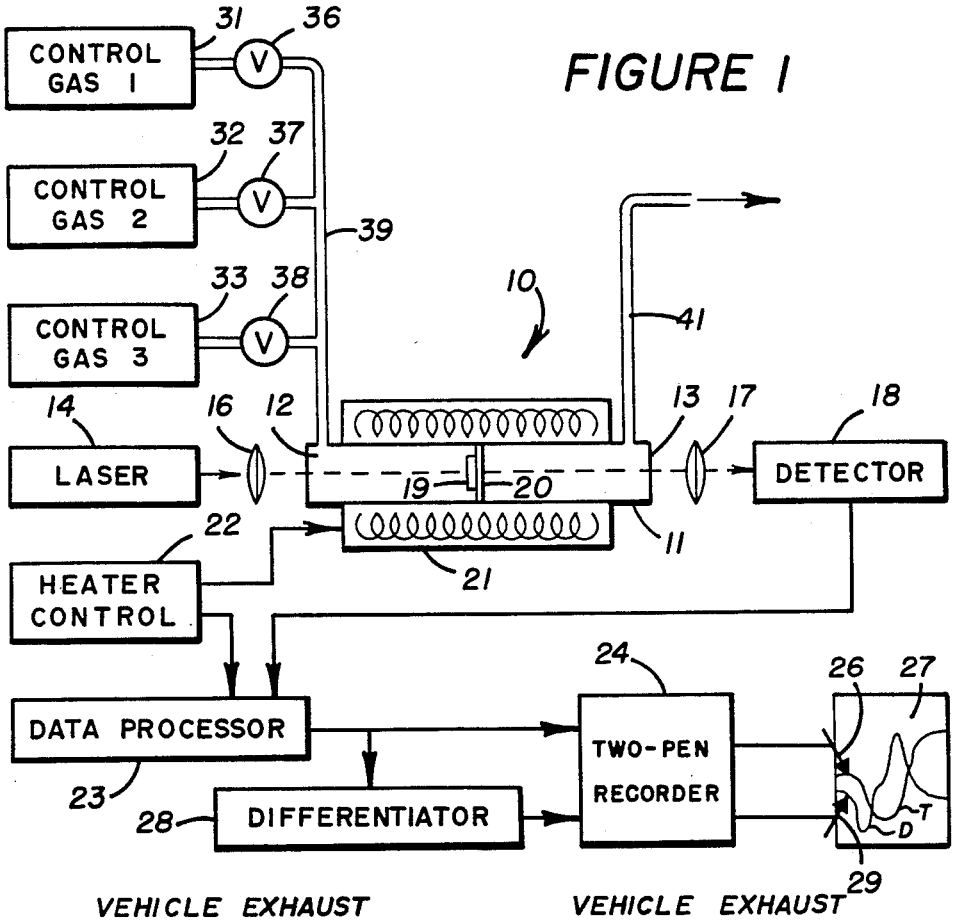
FIG. 1 shows in block diagram form the apparatus of the optical analyzer used in the present invention.

FIG. 1 illustrates one form of an optical analyzer 10 which may be used in carrying out the method of the present invention. In particular, the optical analyzer 10 includes a combustion tube 11 having clear, light transmitting ends 12 and 13, and a light source 14 (preferably a He-Ne laser) whose output passes through lens 16 and combustion tube 11, with the magnitude of the light through focusing lens 17 being detected by detector 18.

A sample 19 of the particulate matter to be analyzed is collected, in a conventional manner, on a clear quartz fiber filter 20 and is positioned in the combustion tube 11 so that the light beam from the source 24 will pass therethrough.

A heater 21, preferably an electric resistance heater, is provided to heat the sample 19 in combustion tube 11. A ramp heater control 22 regulates the heating of heater 21 so that the temperature thereof increases at a linear rate. The heater 21 will heat the combustion tube 11 from room temperature, i.e. below the temperature at which pyrolysis of carbonaceous material may occur, to a temperature well above that at which combustion of black carbon will occur. The heater control 22 will also output a signal to data processor 23 corresponding to the temperature of the heater 21, and thus to the temperature of the sample 19.

The detector will also output a siqnal to the data processor 23 corresponding to the magnitude of the detected light, and thus to the degree of optical transmission of the sample 19. The output from the data processor 23 is then applied to the two pen recorder 24 so that pen 26 thereof will produce a trace, or signature, T, on chart 27, which signature is plotted as optical transmission of the sample versus the temperature of the sample. The output of the data processor is also applied to differentiator 28 which will generate and produce an output signal corresponding to the first derivative of the optical transmission versus temperature output of the data processor 23. The differentiator output is also applied to the two pen recorder so that pen 29 will produce a trace, or signature, D, which is plotted on chart 27 as the rate of change of the optical transmission of sample 19 versus its temperature.

The optical analyzer 10 also includes a plurality of sources 31, 32 and 33 of control gases which may be selectively connected to the combustion tube 11 by valves 36, 37 or 38 to the manifold tube 39 leading to the combustion tube 11. The control gases may, for example, be ambient air, oxygen or an inert gas such as nitrogen. The gas leaving the combustion tube 11 through outlet conduit 41 may either be exhausted to atmosphere or sent to other equipment (not shown) for other analyses, as desired.

The essential new development of the present invention is that the processing and display of the data highlights features of the optical transmission versus temperature curve and the first derivative thereof in such a way as to accentuate and present certain signature characteristics of the material undergoing analysis. As more fully discussed below, different peaks and structure of the curves represent different physical and chemical processes and convey a variety of quantitative and qualitative information about the material. The basic processes observed by the present invention are those of pyrolysis (the production of optically absorbing material at low and intermediate temperatures), followed by combustion (the removal of all optically absorbing carbon at high temperatures). The manner in which the optical transmission of the sample changes with temperature, accentuated by the rate at which the optical transmission changes are characteristic of the sample's physical and chemical properties at both the molecular scale and the scale of its porosity and particle size. For example, polymerized or oxygenated organic compounds are more likely to pyrolyze (with a decrease in optical transmission) than to volatilize (and not be seen in this analysis). Also, particles of a large physical size (e.g., greater than 50–100 microns) will resist combustion for a longer time or at a higher temperature than would extremely fine particles (e.g. of size less than 1 micron). In such case, the rate of change of optical transmission and temperature of combustion will vary because of the difference in particle size.

FIGS. 2–7 illustrate representative charts that have been obtained by use of the present invention and some of the information that can be determined therefrom. The "T" curves are optical transmission versus temperature; the "D" curves are the first derivative, or the rate of change of the optical transmission versus temperature. A negative peak on a D curve indicates the production of optically absorbing pryolyzate.

Figure 2:
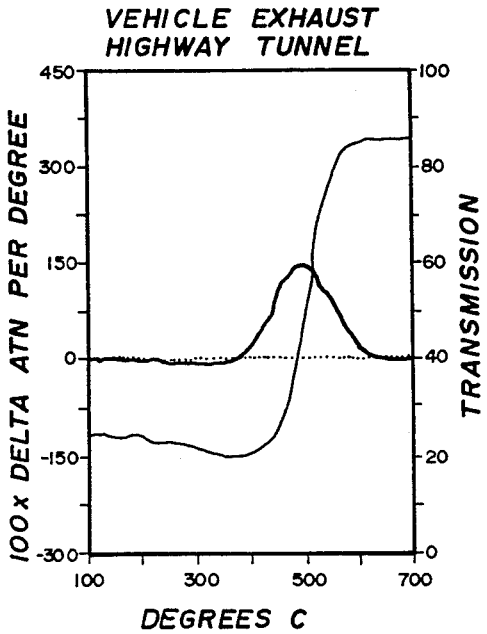
FIGS. 2–7 show different signatures plotted for various samples of particulate matter to illustrate some of the information which may be obtained by use of the present invention.
Figure 3:
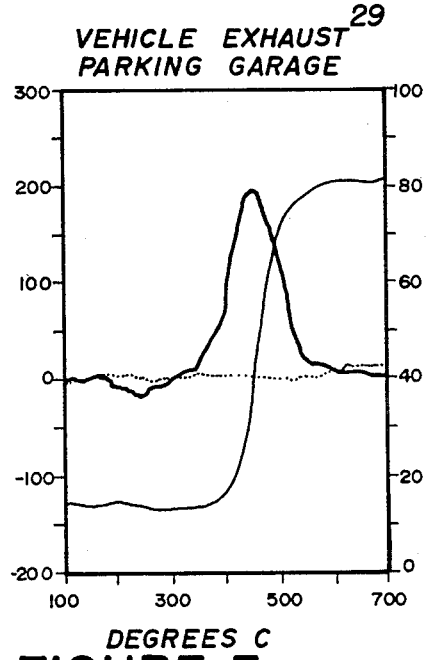
Figure 4:
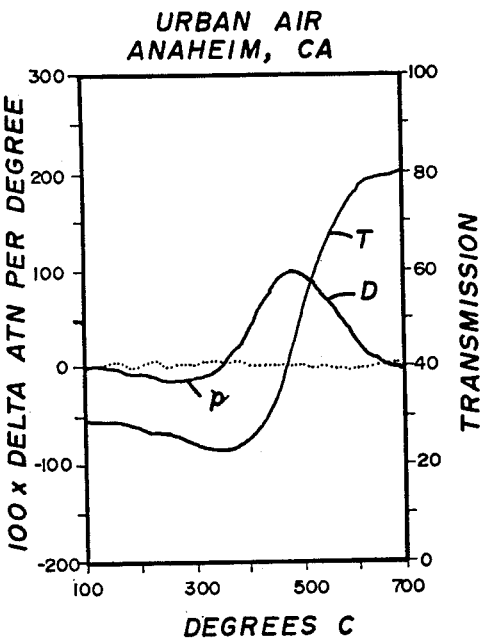
Figure 5:
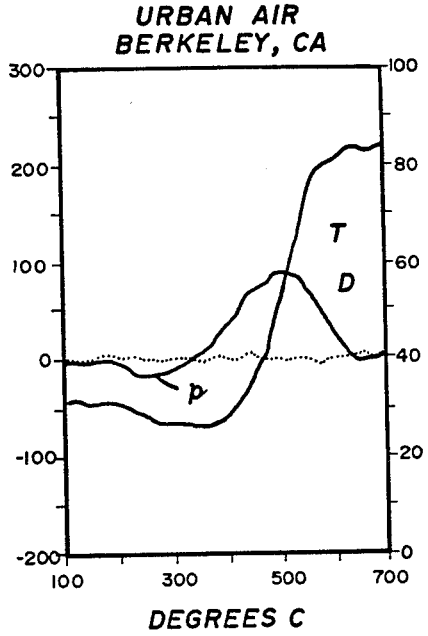

FIGS. 2 and 3 represent charts obtained from samples of fresh vehicle exhaust, from a highway tunnel and a parking garage, respectively. The very small negative peaks on the D curve indicate that both of the samples are virtually free of optically absorbing pyrolyzate and that the carbon content of the samples is virtually completely black carbon. FIGS. 4 and 5 represent charts obtained from samples of urban ambient air particles collected in two different California cities. In both of these charts, the presence of a more pronounced negative peak "p" shows a slight chemical decomposition and production of light absorbing material at these temperatures.

Figure 6:
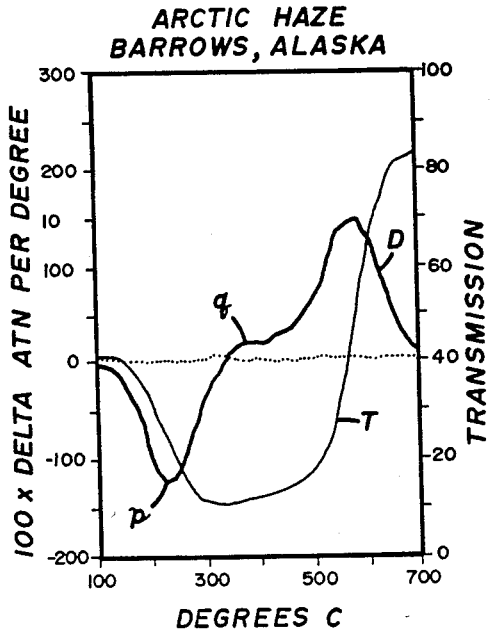
Figure 7:
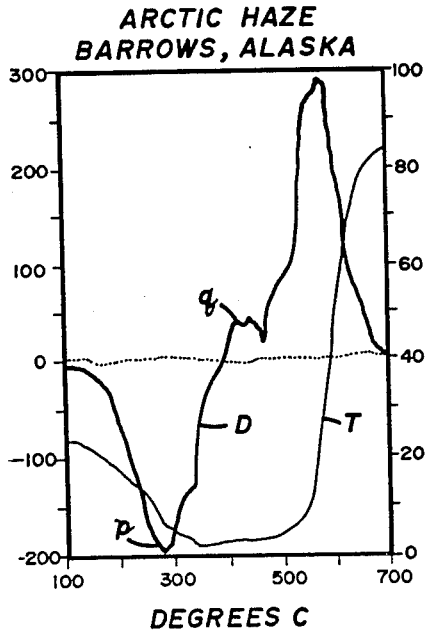

FIGS. 6 and 7 represent charts obtained from air particles in the arctic haze at Barrow, Ak. These particles have resided in the atmosphere for a very long time and appear to have been oxygenated and polymerized. Both charts show a strong negative pyrolysis peak "p" at about 275 degrees C. and an additional feature "q" at the onset of the position combustion peak of the D curve, such feature being more pronounced in FIG. 7. The positive D curve peak in FIG. 7 is higher than that of FIG. 6, indicating that the rate of combustion of the particles in the sample of FIG. 7 is greater than that of the particles in the sample of FIG. 6. The signatures, i.e. the structure of the D and T curves, of the arctic haze particles in FIGS. 6 and 7 are clearly different and readily distinguishable from those of the vehicle exhaust particles in FIGS. 2 and 3, although all of these samples as collected might appear equally black and have almost identical elemental analyses.

The signature of the samples may be obtained with ordinary ambient atmosphere as a control gas during heating of the sample, but it is a feature of the invention that the heating process can be repeated in different atmospheres with other collected samples of the same particulate matter, which different atmospheres in turn can alter the composition changes and the signature of the substance. By comparison of the sample signatures, it is possible to determine the composition rapidly and accurately enough for many purposes.

For example, a sample of sugar in a regular atmosphere would have a good optical transmission at the start, but would get progressively darker as the temperature rises and the sugar dehydrates. As the temperature increases further, combustion will occur and the oxidation of the blackened carbon will cause the optical transmission to increase. In an atmosphere of nitrogen, the sample will get progressively blacker until complete dehydration occurs and will then remain black. In an enhanced oxygen atmosphere, the sugar will oxidize sooner than with ambient atmosphere. Since dehydration rates and oxidation characteristics of a sample will vary with the composition of the control gases, the method of the present invention will provide differential data to enable better analysis of a sample.

The heating process can also be varied in rate of temperature rise, and the similarity or differences in the signatures for samples of the same particulate matter may be used to infer particle size, reaction rate constants, and the like.

The heating process can be conducted in different atmospheres that may in turn be varied during the run, analogously to the variable carrier element technique used in chromatography. Intermediaries of this process are produced that are subsequently combusted. The signature of the production and destruction of the intermediaries may yield information as to the composition of the original sample. Different portions of the signature may represent different ingredients of a mixed sample. For example, with a mixture of sugar and soot, the overall blackness of the initial sample is entirely due to the soot. However, the sugar will pyrolyze at an intermediate temperature and can thereby be detected.

The foregoing description of the preferred embodiments have been presented for the purposes of illustration and description. It is not intended to be exhaustive or to limit the invention to the precise features described, and obviously many modifications and variations are possible in light of the above teaching. For example, the techniques of the present invention are adaptable to any finely divided, precipitated, or evaporated sample, and may be extended to studies in almost any field of chemistry, materials science, biology and the like. The embodiments were shown in order to explain most clearly the principles of the invention and the practical applications thereby to enable others in the art to utilize most effectively the invention in various other modifications as may be suited to the particular use contemplated. It is intended that the scope of the invention be defined by the claims appended hereto.

What is claimed is:

1. A method of analyzing particulate matter in which there is at least one sample of said particulate matter collected on a light transmitting filter comprising:

(a) passing a light beam through said sample,
(b) heating said sample and increasing the temperature thereof at a controlled rate,
(c) maintaining said sample in a controlled atmosphere as the temperature thereof is increased,
(d) detecting the intensity of light transmitted through said sample,
(e) determining the magnitude of transmission of light through said sample as the temperature of said sample is increased,
(f) determining the rate of change of the transmission of light through said sample as the temperature of said sample is increased,
(g) plotting said rate of change of transmission versus temperature on a chart.

2. A method of analyzing particulate matter as set forth in claim 1 and further including repeating said steps (a) through (g) with another sample of the same particulate matter collected while maintaining said sample in another and different controlled atmosphere during the heating thereof.

3. A method of analyzing particulate matter as set forth in claim 1 and further including repeating said steps (a) through (g) with another sample of the same particulate matter while increasing the temperature thereof at a different controlled rate.

4. A method of analyzing particulate matter as set forth in claim 1 and further including:

(h) plotting on said chart said determined magnitude of transmission of light through said sample versus temperature.

5. A method of analyzing particulate matter as set forth in claim 4 and further including repeating said steps (a) through (h) with another sample of the same particulate matter while maintaining said sample in another and different controlled atmosphere during the heating thereof.

6. A method of analyzing particulate matter as set forth in claim 4 and further including repeating said steps (a) through (h) with another sample of the same particulate matter while increasing the temperature thereof at a different controlled rate.

7. A method of analyzing particulate matter as set forth in claim 1 wherein said particulate matter is a carbonaceous material, and wherein said sample is heated through a range of temperatures starting below the temperature at which pyrolysis of the material may occur and ending above the temperature at which combustion of the material will occur.

8. A method of analyzing particulate matter as set forth in claim 7 and further including repeating said steps (a) through (g) with another sample of the same particulate matter while maintaining said sample in another and different controlled atmosphere during the heating thereof.

9. A method of analyzing particulate matter as set forth in claim 7 and further including repeating said steps (a) through (g) with another sample of the same particulate matter while increasing the temperature thereof at a different controlled rate.

10. A methodof analyzing particulate matter as set forth in claim 7 and further including:

(h) plotting on said chart said determined magnitude of transmission of light through said sample versus temperature.

11. A method of analyzing particulate matter as set forth in claim 10 and further including repeating said steps (a) through (h) with another sample of the same particulate matter while maintaining said sample in another and different controlled atmosphere during the heating thereof.

12. A method of analyzing particulate matter as set forth in claim 10 and further including repeating said steps (a) through (h) with another sample of the same particulate matter while increasing the temperature thereof at a different controlled rate.

13. An optical analyzer for use in analyzing a sample of particulate matter collected in a light transmitting filter, comprising:

(a) a combustion tube adapted to have said filter disposed therewithin,
(b) means for heating said combustion tube at a controlled rate,
(c) means for passing a beam of light through said combustion tube and a filter disposed therewithin as said combustion tube is heated,
(d) means for detecting the magnitude of said beam of light after it passes through said combustion tube,
(e) means for determining a rate of change of the magnitude of said beam of light after it passes through said combustion tube,
(f) means for plotting on a chart the rate of change of the magnitude of said beam of light after it passes through said combustion tube versus the temperature of said combustion tube.

14. An optical analyzer as set forth in claim 13 and further including means for maintaining a controlled atmosphere within said combustion tube as said combustion tube is heated.

15. An optical analyzer as set forth in claim 13 and further including means for selectively connecting one of a plurality of different controlled atmospheres to the interior of said combustion tube.

16. An optical analyzer as set forth in claim 13 and further including:

means for plotting on said chart the magnitude of said beam of light after it passes through said combustion tube versus the temperature of said combustion tube.

17. An optical analyzer as set forth in claim 16 and further including means for maintaining a controlled atmosphere within said combustion tube as said combustion tube is heated.

18. An optical analyzer as set forth in claim 16 and further including means for selectively connecting one of a plurality of different controlled atmospheres to the interior of said combustion tube.

* * * * *